United States Patent
Zhang

(10) Patent No.: US 11,989,917 B2
(45) Date of Patent: May 21, 2024

(54) LINE STRIPE MISMATCH DETECTION AND THREE-DIMENSIONAL RECONSTRUCTION METHOD AND DEVICE

(71) Applicant: Shining 3D Tech Co., Ltd., Zhejiang (CN)

(72) Inventor: Jian Zhang, Zhejiang (CN)

(73) Assignee: Shining 3D Tech Co., Ltd., Zhejiang (CN)

(*) Notice: Subject to any disclaimer, the term of this patent is extended or adjusted under 35 U.S.C. 154(b) by 368 days.

(21) Appl. No.: 17/426,124

(22) PCT Filed: Feb. 3, 2020

(86) PCT No.: PCT/CN2020/074224
§ 371 (c)(1),
(2) Date: Jul. 28, 2021

(87) PCT Pub. No.: WO2020/156578
PCT Pub. Date: Aug. 6, 2020

(65) Prior Publication Data
US 2022/0101559 A1    Mar. 31, 2022

(30) Foreign Application Priority Data
Jan. 31, 2019 (CN) .......................... 201910101224.4

(51) Int. Cl.
*G06T 7/00* (2017.01)
*G06F 18/22* (2023.01)
(Continued)

(52) U.S. Cl.
CPC ............... *G06T 7/97* (2017.01); *G06F 18/22* (2023.01); *G06T 7/521* (2017.01); *G06V 10/75* (2022.01);
(Continued)

(58) Field of Classification Search
CPC . G06T 7/97; G06T 7/521; G06T 2207/20228; G06T 2207/10012;
(Continued)

(56) References Cited

U.S. PATENT DOCUMENTS 5,852,672 A * 12/1998 Lu ........................... G06T 17/00
356/604
6,388,666 B1 * 5/2002 Murray ................ H04N 13/279
348/E13.02
(Continued)

FOREIGN PATENT DOCUMENTS

CN    102313536 A    1/2012
CN    103727927 A    4/2014
(Continued)

OTHER PUBLICATIONS

Robinson A et al: Methods for Indexing Stripes in Uncoded StructureKi Light Scanning Systems11, Journal of WSCG, VACIaAV SKALA—Union Agency, Plzen, Czech Republic, vol. 12f No. 1-3z Feb. 5, 2004 (Feb. 5, 2004), pp. 1-8, XP002327735, ISSN: 1213-6972.
(Continued)

*Primary Examiner* — Tom Y Lu
(74) *Attorney, Agent, or Firm* — Samson G. Yu

(57) ABSTRACT

The present invention discloses a line stripe mismatch detection and three-dimensional reconstruction method and device. The method includes: acquiring a first image of line stripes collected by a first camera and a second image of line stripes collected by a second camera, where the first image at least includes: a first line stripe and a second line stripe; the second image at least includes: a third line stripe and a fourth line stripe, the first line stripe is adjacent to the second line stripe, and the third line stripe is adjacent to the fourth line stripe; matching the first line stripe with the third line stripe, determining a first test distance between the first line stripe and the third line stripe, matching the second line stripe
(Continued)

stripe with the fourth line stripe, and determining a second test distance between the second line stripe and the fourth line stripe; and determining whether the line stripes are mismatched according to the first test distance and the second test distance. The present invention solves the technical problem of incapability of detecting whether the line stripes are mismatched.

9 Claims, 6 Drawing Sheets

(51) Int. Cl.
    *G06T 7/521* (2017.01)
    *G06V 10/75* (2022.01)
    *H04N 23/90* (2023.01)

(52) U.S. Cl.
    CPC ... *H04N 23/90* (2023.01); *G06T 2207/20228* (2013.01)

(58) Field of Classification Search
    CPC .. G06T 7/593; G06T 7/55; G06T 7/62; G06T 17/00; G06T 2207/10004; G06F 18/22; G06V 10/75; H04N 23/90; G01B 11/2545
    See application file for complete search history.

(56) References Cited

U.S. PATENT DOCUMENTS

| | | | |
|---|---|---|---|
| 6,664,531 B2 * | 12/2003 | Gartner | G01B 11/245 |
| | | | 250/559.4 |
| 10,401,143 B2 * | 9/2019 | Hillebrand | G06F 3/0325 |
| 2013/0050476 A1 * | 2/2013 | Shi | G01B 11/2545 |
| | | | 348/139 |
| 2014/0085408 A1 | 3/2014 | Kuo et al. | |
| 2015/0228081 A1 | 8/2015 | Kim et al. | |
| 2016/0328601 A1 | 11/2016 | Ming et al. | |

FOREIGN PATENT DOCUMENTS

| | | |
|---|---|---|
| CN | 106225723 A | 12/2016 |
| CN | 106651897 A | 5/2017 |
| CN | 106802138 A | 6/2017 |
| CN | 108151671 A | 6/2018 |
| CN | 108267097 A | 7/2018 |
| CN | 108322724 A | 7/2018 |
| CN | 108592822 A | 9/2018 |
| CN | 109186491 A | 1/2019 |
| IN | 103900494 A | 7/2014 |
| IN | 107123156 A | 9/2017 |
| JP | 2001082954 A | 3/2001 |
| JP | 2001184497 A | 7/2001 |

OTHER PUBLICATIONS

Min Young Kim et al: 11 An active trinocular vision system for sensing mobile robot navigation environments, Intelligent Robots and Systems, 2004 (IROS 2004), PROCEEDINGS, 2004 I EEE/ RSJ International Conference on Sendai, Japan Sep. 28-Oct. 2, 2004, Piscataway, NJ, USA,IEEE, Piscataway, NJ USA, vol. 2, Sep. 28, 2004 (Sep. 28, 2004), pp. 1698-1703, XP010765903, ISBN: 978-0-7803-8463-7.

EESR issued for EP patent family application on Mar. 28, 2022.

* cited by examiner

Fig. 4

Project the line stripes onto a surface of an object to be scanned, wherein the line stripes include: a first line stripe cycle and a second line stripe cycle, a distance between a line stripe at a first position in the first line stripe cycle and a line stripe at a first position in the second line stripe cycle is a first predetermined distance, and a distance between a line stripe at a second position in a first line stripe cycle and the line stripe at a second position in the second line stripe cycle is a second predetermined distance, the first predetermined distance is different from the second predetermined distance, the line stripe at the first position and the line stripe at the second position in the same line stripe cycle are adjacent — S402

Collect, by the first camera and the second camera, the line stripes on the surface of the object to be scanned — S404

Detect whether the line stripes collected by the first camera and the line stripes collected by the second camera are mismatched according to the distances between the line stripes at the same position in different line stripe cycles — S406

LINE STRIPE MISMATCH DETECTION AND THREE-DIMENSIONAL RECONSTRUCTION METHOD AND DEVICE

The present application claims the priority of Chinese patent application No. 201910101224.4, filed to CNIPA on Jan. 31, 2019 and entitled "Line Stripe Mismatch Detection and Three-dimensional Reconstruction Method and Device", the entire content of which is incorporated herein by reference.

TECHNICAL FIELD

The present invention relates to the field of three-dimensional scanning, in particular to a line stripe mismatch detection and three-dimensional reconstruction method and device.

BACKGROUND

In a structured light binocular reconstruction system, a projector (or laser generator) projects a designed pattern onto the surface of an object surface, then binocular cameras in the binocular reconstruction system simultaneously collect pictures of the object, afterwards, points corresponding a certain point on the object are determined in the two pictures collected by the binocular cameras, and a depth value of the point is calculated according to a parallax between the corresponding points in the two pictures, thereby constructing a three-dimensional model of the object.

It should be noted that the parallax is a difference between the corresponding points in horizontal positions in the pictures taken by the binocular cameras. The parallax is negatively correlated with the depth value.

In the structured light binocular reconstruction system, the projector projects a plurality of vertical line stripes at equal intervals, among which a plurality of adjacent line stripes form a cycle. All the projected line stripes may be divided into a plurality of cycles, and $l_{i,j}$ is set as the jth line stripe in the ith cycle.

Due to the limitation of application scenarios, in the three-dimensional reconstruction process, only the number of each line stripe in the cycle can be obtained, but the cycle number of each line stripe cannot be obtained. Thus, line stripe in adjacent cycles are prone to mismatches, causing wrong three-dimensional reconstruction results. For example, the line stripe $l_{i,j}$ mismatches with the line stripe $l_{i+1,j}$.

At present, there is no effective solution provided to solve the above problem of incapability of detecting whether the line stripes are mismatched.

SUMMARY

Embodiments of the present invention provide a line stripe mismatch detection and three-dimensional reconstruction method and device to at least solve the technical problem of incapability of detecting whether the line stripes are mismatched.

According to one aspect of the embodiments of the present invention, provided is a line stripe mismatch detection method, including: acquiring a first image of line stripes collected by a first camera and a second image of line stripes collected by a second camera, wherein the first image at least includes: a first line stripe and a second line stripe; the second image at least includes: a third line stripe and a fourth line stripe, the first line stripe is adjacent to the second line stripe, and the third line stripe is adjacent to the fourth line stripe; matching the first line stripe with the third line stripe to determine a first test distance between the first line stripe and the third line stripe, matching the second line stripe with the fourth line stripe to determine a second test distance between the second line stripe and the fourth line stripe; and determining whether the line stripes are mismatched according to the first test distance and the second test distance.

Optionally, before acquiring the first line stripe and the second line stripe collected by the first camera and the third line stripe and the fourth line stripe collected by the second camera, the method further includes: projecting the line stripes onto a surface of an object to be scanned, wherein the line stripes include: a first line stripe cycle and a second line stripe cycle, a distance between a line stripe at a first position in the first line stripe cycle and a line stripe at a first position in the second line stripe cycle is a first predetermined distance, a distance between a line stripe at a second position in the first line stripe cycle and a line stripe at a second position in the second line stripe cycle is a second predetermined distance, the first predetermined distance is different from the second predetermined distance, and the line stripe at the first position and the line stripe at the second position in the same line stripe cycle are adjacent; and collecting, by the first camera and the second camera, the line stripes on the surface of the object to be scanned.

Optionally, before acquiring the first line stripe and the second line stripe collected by the first camera and the third line stripe and the fourth line stripe collected by the second camera, the method further includes: projecting the line stripes onto a surface of an object to be scanned, wherein the line stripes include: a plurality of line stripes, and adjacent distances between the adjacent line stripes in the plurality of line stripes are different; and collecting, by the first camera and the second camera, the line stripes on the surface of the object to be scanned.

According to another aspect of the embodiments of the present invention, further provided is a line stripe mismatch detection method, including: projecting line stripes onto a surface of an object to be scanned, wherein the line stripes include: a first line stripe cycle and a second line stripe cycle, a distance between the line stripe at a first position in the first line stripe cycle and the line stripe at a first position in the second line stripe cycle is a first predetermined distance, a distance between the line stripe at a second position in the first line stripe cycle and the line stripe at a second position in the second line stripe cycle is a second predetermined distance, the first predetermined distance is different from the second predetermined distance, the line stripe at the first position and the line stripe at the second position in the same line stripe cycle are adjacent, and cycle distances include: the first predetermined distance and the second predetermined distance; collecting, by a first camera and a second camera, the line stripes on the surface of the object to be scanned; and detecting whether the line stripes collected by the first camera and the line stripes collected by the second camera are mismatched according to the cycle distances.

According to another aspect of the embodiments of the present invention, further provided is a line stripe mismatch detection method, including: projecting line stripes onto a surface of an object to be scanned, wherein adjacent distances between the adjacent line stripes in the plurality of line stripes are different; collecting, by a first camera and a second camera, the line stripes on the surface of the object to be scanned; and detecting whether the line stripes collected by the first camera and the line stripes collected by the second camera are mismatched according to the distances.

According to another aspect of the embodiments of the present invention, further provided is a three-dimensional reconstruction method, including: acquiring a first image of line stripes collected by a first camera and a second image of line stripes collected by a second camera, wherein the line stripes include: a first line stripe cycle and a second line stripe cycle, a distance between the line stripe at a first position in the first line stripe cycle and the line stripe at a first position in the second line stripe cycle is a first predetermined distance, a distance between the line stripe at a second position in the first line stripe cycle and the line stripe at a second position in the second line stripe cycle is a second predetermined distance, the first predetermined distance is different from the second predetermined distance, and the line stripe at the first position and the line stripe at the second position in the same line stripe cycle are adjacent; and performing three-dimensional reconstruction according to the line stripes in the first image and the second image.

According to another aspect of the embodiments of the present invention, further provided is a three-dimensional reconstruction method, including: acquiring a first image of line stripes collected by a first camera and a second image of line stripes collected by a second camera, wherein adjacent distances between the adjacent line stripes in the plurality of line stripes are different; and performing three-dimensional reconstruction according to the line stripes in the first image and the second image.

According to another aspect of the embodiments of the present invention, further provided is a line stripe mismatch detection device, including: a first acquisition unit, configured to acquire a first image of line stripes collected by a first camera and a second image of line stripes collected by a second camera, wherein the first image at least includes: a first line stripe and a second line stripe; the second image at least includes: a third line stripe and a fourth line stripe, the first line stripe is adjacent to the second line stripe, and the third line stripe is adjacent to the fourth line stripe; a first determination unit, configured to match the first line stripe with the third line stripe, determine a first test distance between the first line stripe and the third line stripe, match the second line stripe with the fourth line stripe, and determine a second test distance between the second line stripe and the fourth line stripe; and a second determination unit, configured to determine whether the line stripes are mismatched according to the first test distance and the second test distance.

According to another aspect of the embodiments of the present invention, further provided is a line stripe mismatch detection device, including: a first projection unit, configured to project the line stripes onto a surface of an object to be scanned, wherein the line stripes include: a first line stripe cycle and a second line stripe cycle, a distance between the line stripe at a first position in the first line stripe cycle and the line stripe at a first position in the second line stripe cycle is a first predetermined distance, a distance between the line stripe at a second position in the first line stripe cycle and the line stripe at a second position in the second line stripe cycle is a second predetermined distance, the first predetermined distance is different from the second predetermined distance, the line stripe at the first position and the line stripe at the second position in the same line stripe cycle are adjacent, and cycle distances include: the first predetermined distance and the second predetermined distance; a first collection unit, configured to collect, by a first camera and a second camera, the line stripes on the surface of the object to be scanned; and a first detection unit, configured to detect whether the line stripes collected by the first camera and the line stripes collected by the second camera are mismatched according to the cycle distances.

According to another aspect of the embodiments of the present invention, further provided is a line stripe mismatch detection device, including: a second projection unit, configured to project line stripes onto a surface of an object to be scanned, wherein adjacent distances between the adjacent line stripes in the plurality of line stripes are different; a second collection unit, configured to collect, by a first camera and a second camera, the line stripes on the surface of the object to be scanned; and a second detection unit, configured to detect whether the line stripes collected by the first camera and the line stripes collected by the second camera are mismatched according to the distances.

According to another aspect of the embodiments of the present invention, further provided is a three-dimensional reconstruction device, including: a second acquisition unit, configured to acquire a first image of line stripes collected by a first camera and a second image of line stripes collected by a second camera, wherein the line stripes include: a first line stripe cycle and a second line stripe cycle, a distance between a line stripe at a first position in the first line stripe cycle and a line stripe at a first position in the second line stripe cycle is a first predetermined distance, a distance between a line stripe at a second position in the first line stripe cycle and a line stripe at a second position in the second line stripe cycle is a second predetermined distance, the first predetermined distance is different from the second predetermined distance, and the line stripe at the first position and the line stripe at the second position in the same line stripe cycle are adjacent; and a first reconstruction unit, configured to perform three-dimensional reconstruction according to the line stripes in the first image and the second image.

According to another aspect of the embodiments of the present invention, further provided is a three-dimensional reconstruction device, including: a third acquisition unit, configured to acquire a first image of line stripes collected by a first camera and a second image of line stripes collected by a second camera, wherein adjacent distances between the adjacent line stripes in the plurality of line stripes are different; and a second reconstruction unit, configured to perform three-dimensional reconstruction according to the line stripes in the first image and the second image.

According to another aspect of the embodiments of the present invention, further provided is a storage medium, including a stored program, wherein when being run, the program controls an apparatus where the storage medium is located to execute the above line stripe mismatch detection method, or execute the above three-dimensional reconstruction method.

According to another aspect of the embodiments of the present invention, further provided is a processor, configured to run a program, wherein when being run, the program executes the above line stripe mismatch detection method, or executes the above three-dimensional reconstruction method.

According to the above embodiments of the present invention, in the three-dimensional modeling process, the first camera acquires the first line stripe and the second line stripe adjacent to each other, the second camera acquires the third line stripe and the fourth line stripe adjacent to each other, the first line stripe is matched with the third line stripe, the second line stripe is matched with the fourth line stripe, then the first test distance between the first line stripe and the third line stripe and the second test distance between the second line stripe and the fourth line stripe are calculated, and whether the first line stripe and the third line stripe to be mismatched and whether the second line stripe and the fourth line stripe to be mismatched are determined according to the first test distance and the second test distance, so that the technical effect of detecting whether the line stripes to be mismatched is realized, thereby solving the technical problem of incapability of detecting whether the line stripes are mismatched.

BRIEF DESCRIPTION OF THE DRAWINGS

The drawings described herein are provided further understanding of the present invention, and constitute a part of the present application. The exemplary embodiments of the present invention and descriptions thereof are used to explain the present invention, and do not constitute improper limitations of the present invention. In the accompanying drawings:

FIG. 4 is a flow chart of a line stripe mismatch detection method according to an embodiment of the present invention;

DETAILED DESCRIPTION

In order to make those skilled in the art better understand the solutions of the present invention, the technical solutions in the embodiments of the present invention will be described clearly and completely in the following with reference to the accompanying drawings in the embodiments of the present invention. Obviously, the described embodiments are merely a part of the embodiments of the present invention, rather than all the embodiments. All other embodiments obtained by a person of ordinary skill in the art based on the embodiments of the present invention without creative efforts shall fall within the protection scope of the present invention.

It should be noted that the terms "first", "second", and the like in the specification and claims of the present invention and the foregoing drawings are used to distinguish similar objects and do not necessarily describe a specific sequence or order. It should be understood that the data used as such may be interchanged where appropriate so that the embodiments of the present invention described herein can be implemented in other than the order illustrated or described herein. In addition, the terms "include", "comprise" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

According to an embodiment of the present invention, provided is a line stripe mismatch detection method embodiment. It should be noted that steps shown in the flow chart of the accompanying drawing may be executed in a computer system such as a set of computer-executable instructions. In addition, although a logical order is shown in the flow chart, in some cases, the steps shown or described may be executed in a different order than here.

Figure 1:
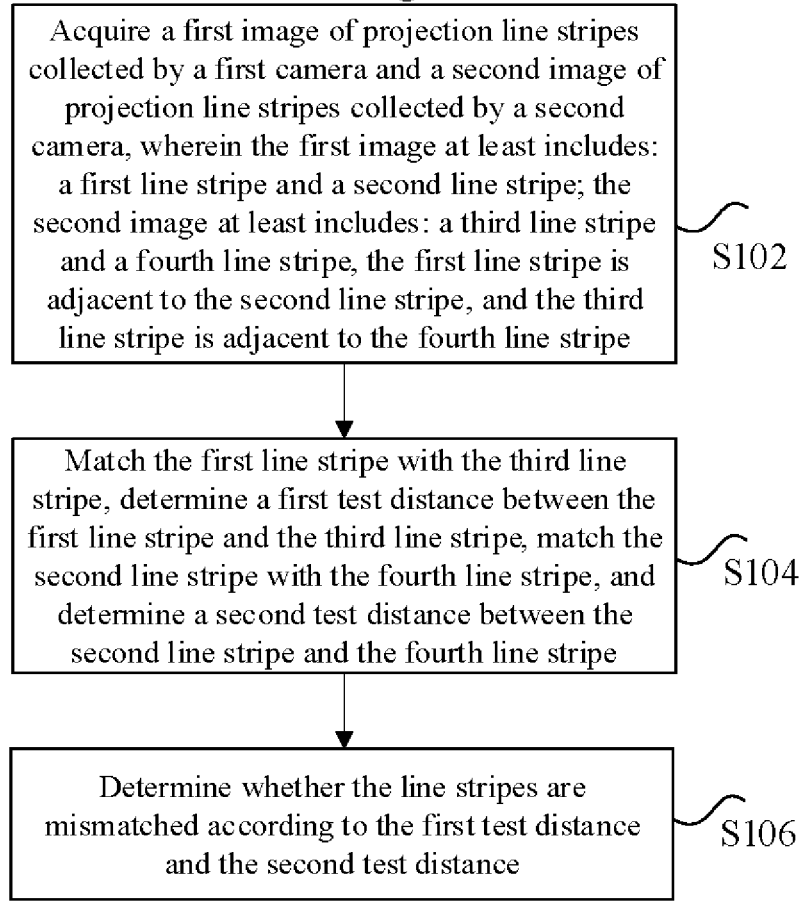
FIG. 1 is a flow chart of a line stripe mismatch detection method according to an embodiment of the present invention.

FIG. 1 is a flow chart of a line stripe mismatch detection method according to an embodiment of the present invention. As shown in FIG. 1, the method includes the following steps:

step S102, acquire a first image of line stripes collected by a first camera and a second image of line stripes collected by a second camera, wherein the first image at least includes: a first line stripe and a second line stripe; the second image at least includes: a third line stripe and a fourth line stripe, the first line stripe is adjacent to the second line stripe, and the third line stripe is adjacent to the fourth line stripe;

step S104, match the first line stripe with the third line stripe, determine a first test distance between the first line stripe and the third line stripe, match the second line stripe with the fourth line stripe, and determine a second test distance between the second line stripe and the fourth line stripe; and step S106, determine whether the line stripes are mismatched according to the first test distance and the second test distance.

Through the above steps, in the three-dimensional modeling process, the first camera acquires the first line stripe and the second line stripe adjacent to each other, the second camera acquires the third line stripe and the fourth line stripe adjacent to each other, the first line stripe is matched with the third line stripe, the second line stripe is matched with the fourth line stripe, then the first test distance between the first line stripe and the third line stripe and the second test distance between the second line stripe and the fourth line stripe are calculated, and whether the first line stripe and the third line stripe to be mismatched and whether the second line stripe and the fourth line stripe to be mismatched are determined according to the first test distance and the second test distance, so that the technical effect of detecting whether the line stripes to be mismatched is realized, thereby solving the technical problem of incapability of detecting whether the line stripes are mismatched.

It should be noted that in the three-dimensional modeling process, the line stripes are projected to the object to be scanned. In a binocular stereo vision system, the first camera and the second camera synchronously collect the modulated images of the line stripes of the object to be scanned, the first camera collects the first image, and the second camera collects the second image. The first image includes: the first line stripe and the second line stripe, and the second image includes: the third line stripe and the fourth line stripe.

It should be noted that in the process of matching the line stripes in the first image and the second image, mismatch detection may be performed in the matching process. If a mismatch occurs, matching is performed again. The mismatch detection may also be performed after the completion of the matching. If a mismatch occurs, data related to the mismatch, for example, data of mismatched line stripes, is deleted.

It should be noted that if the scanned object is a continuous curved surface, then depth values of the line stripes on the object surface in the adjacent line stripe cycles do not change much. Besides, a parallax is negatively correlated to the depth value. Therefore, in the process of determining whether the line stripes are mismatched, a distance between each line stripe in the first image and each line stripe in the second image can be calculated so as to determine a parallax between each line stripe in the first image and each line stripe in the second image as well as a depth value corresponding to the parallax between the line stripes, and then whether there is a huge change in the depth values of the adjacent line stripes is determined, so as to determine whether the line stripes are mismatched.

It should be noted that the distance between the line stripes is correlated with the parallax and the parallax is correlated with the depth value. Therefore, it can be determined whether the line stripes are mismatched by determining whether there is a huge change in the disparities of the adjacent line stripes or determining whether there is a huge change in the adjacent distances between the adjacent line stripes.

Optionally, the determining whether the line stripes are mismatched according to the first test distance and the second test distance includes: determining a distance difference between the first test distance and the second test distance; determining whether the distance difference is greater than a predetermined distance threshold; if the distance difference is greater than the predetermined distance threshold, determining that the line stripes are mismatched; and if the distance difference is not greater than the predetermined distance threshold, determining the line stripes are not mismatched.

Optionally, the determining whether the line stripes are mismatched according to the first test distance and the second test distance includes: determining a first parallax between the first line stripe and the third line stripe according to the first test distance; determining a second parallax between the second line stripe and the fourth line stripe according to the second test distance; and determining whether the line stripes are mismatched according to the first parallax and the second parallax.

Optionally, the determining whether the line stripes are mismatched according to the first parallax and the second parallax includes: determining a parallax difference between the first parallax and the second parallax; determining whether the parallax difference is greater than a predetermined parallax threshold; if the parallax difference is greater than the predetermined parallax threshold, determining that the line stripes are mismatched; and if the parallax difference is not greater than the predetermined parallax threshold, determining that the line stripes are not mismatched.

Optionally, the determining whether the line stripes are mismatched according to the first parallax and the second parallax includes: determining a first depth value corresponding to the first parallax and a second depth value corresponding to the second parallax; and determining whether the line stripes are mismatched according to the first depth value and the second depth value.

Optionally, the determining whether the line stripes are mismatched according to the first depth value and the second depth value includes: determining a depth difference between the first depth value and the second depth value; determining whether the depth difference is greater than a predetermined depth threshold; if the depth difference is greater than the predetermined depth threshold, determining that the line stripes are mismatched; and if the depth difference is not greater than the predetermined depth threshold, determining that the line stripes are not mismatched.

Optionally, in the three-dimensional modeling process, the line stripe in the first image is matched with the line stripe in the second image to determine the depth value corresponding to each line stripe, so that a three-dimensional scanning model can be constructed according to the depth value corresponding to each line stripe.

It should be noted that in the process of matching the line stripe in the first image with the line stripe in the second image, a position of each line stripe in the corresponding line stripe cycle can be determined, but the sequence number of each line stripe cycle cannot be determined. Therefore, it is possible that the line stripe in the first line stripe cycle is matched with the line stripe in the second line stripe cycle, which leads to a line stripe mismatch.

It should be noted that the distance between the line stripes can determine the parallax and depth value of the line stripe, and the line stripes are set as interval-variable line stripes.

As an optional embodiment, before acquiring the first line stripe and the second line stripe collected by the first camera and the third line stripe and the fourth line stripe collected by the second camera, the method further includes: projecting the line stripes onto a surface of an object to be scanned, wherein the line stripes include: a first line stripe cycle and a second line stripe cycle, a distance between a line stripe at a first position in the first line stripe cycle and a line stripe at a first position in the second line stripe cycle is a first predetermined distance, a distance between a line stripe at a second position in the first line stripe cycle and a line stripe at a second position in the second line stripe cycle is a second predetermined distance, the first predetermined distance is different from the second predetermined distance, the line stripe at the first position and the line stripe at the second position in the same line stripe cycle are adjacent, and cycle distances include: the first predetermined distance and the second predetermined distance; and collecting, by a first camera and a second camera, the line stripes on the surface of the object to be scanned.

Optionally, the line stripes include: the first line stripe cycle and the second line stripe cycle, wherein the distance between the line stripe at the first position in the first line stripe cycle and the line stripe at the first position in the second line stripe cycle is the first predetermined distance, the distance between the line stripe at the second position in the first line stripe cycle and the line stripe at the second position in the second line stripe cycle is the second predetermined distance, and the first predetermined distance is different from the second predetermined distance.

In the above embodiment of the present invention, the line stripes are set according to the above manner and projected onto the surface of the object to be scanned, the first image and the second image of the line stripes are collected by the first camera and the second camera, and the line stripe in the first image is matched with the line stripe in the second image, so as to determine whether the line stripes are mismatched according to the matching result.

Optionally, if the first line stripe cycle is matched with the second line stripe cycle, then the first line stripe is the line stripe at the first position in the first line stripe cycle, the second line stripe is the line stripe at the second position in the first line stripe cycle, the third line stripe is the line stripe at the first position in the second line stripe cycle, and the fourth line stripe is the line stripe at the fourth position in the second line stripe cycle. Therefore, the distance between the first line stripe and the third line stripe is the first predetermined distance, and the distance between the second line stripe and the second line stripe is the second predetermined distance. Since the first predetermined distance is different from the second predetermined distance, it can be found that there is a line stripe mismatch.

Optionally, the first parallax and the first depth value can be determined according to the first predetermined distance, and the second parallax and the second depth value can be determined according to the second predetermined distance. Since the first predetermined distance is different from the second predetermined distance, the first parallax is different from the second parallax, and the first depth value is also different from the second depth value.

It should be noted that the mismatch is usually a mismatch of line stripes in adjacent line stripe cycles.

As an optional embodiment, the first line stripe cycle and the second line stripe cycle are adjacent.

According to the above embodiment of the present invention, a line stripe mismatch usually occurs between the adjacent line stripe cycles, so the first line stripe cycle and the second line stripe cycle may be made adjacent line stripe cycles.

As an optional embodiment, in the same line stripe cycle, the adjacent distances between the adjacent line stripes are distributed according to an equal sum sequence.

According to the above embodiment of the present invention, the equal sum sequence refers to a sequence in which from the second term, the sum of each term and its previous term is a constant.

Optionally, the projector projects a plurality of interval-variable vertical line stripes, wherein the plurality of adjacent line stripes constitute a line stripe cycle, all the line stripes are separated into a plurality of line stripe cycles, and $l_{i,j}$ is set as the jth line stripe in the ith cycle. Due to the limitation of application scenarios, only the number of each line stripe in the cycle can be obtained, but the cycle number of each line stripe cannot be obtained.

Next, a description is made by taking two line stripe cycles, each including 6 line stripes, as an example.

Figure 2:
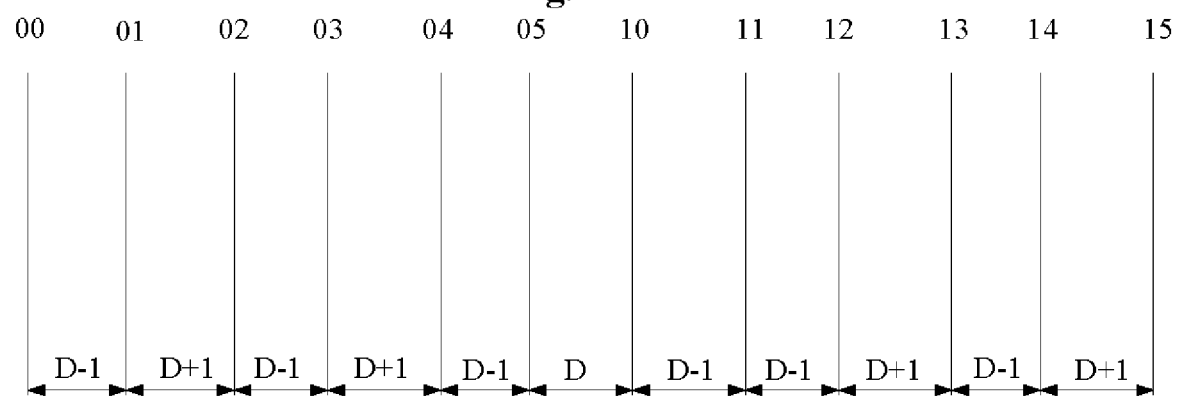
FIG. 2 is a schematic diagram I of the line stripes according to an embodiment of the present invention.

FIG. 2 is a schematic diagram I of the line stripes according to an embodiment of the present invention. As shown in FIG. 2, the line stripes include: a first line stripe cycle and a second line stripe cycle. The first line stripe cycle is adjacent to the second line stripe cycle. The first line stripe cycle includes: 6 line stripes 00, 01, 02, 03, 04 and 05 in total. The second line stripe cycle includes: 6 line stripes 10, 11, 12, 13, 14 and 15 in total. A distance between the line stripes 00 and 01 is D−1, a distance between the line stripes 01 and 02 is D+1, a distance between the line stripes 02 and 03 is D−1, a distance between the line stripes 03 and 04 is D+1, a distance between the line stripes 04 and 05 is D−1, a distance between the line stripes 05 and 10 is D, a distance between the line stripes 10 and 11 is D+1, a distance between the line stripes 11 and 12 is D−1, a distance between line stripes 12 and 13 is D+1, a distance between the line stripes 13 and 14 is D−1, and a distance between the line stripes 14 and 15 is D+1.

It should be noted that $\delta_{i,j}$ is the parallax of the jth line stripe in the ith cycle. For example, $\delta_{0,0}$ is a parallax of the line stripe 00 in the left and right cameras. If a scanned object is a continuous curved surface, depth values of the line stripes on the surface of the object in the adjacent cycles do not change much, and then parallax value will be approximately equal, and are uniformly approximated by δ. If there is a mismatch between the 0th cycle of the left camera (that is, the first line stripe cycle) and the 1st cycle of the right camera (that is, the second line stripe cycle), then a parallax between the line stripe 00 of the left camera and the line stripe 10 of the right camera is ≈δ−6D+1 and a parallax between the line stripe 01 of the left camera and the line stripe 11 of the right camera is ≈δ−6D−1, which causes a drastic change in the reconstruction depth of the adjacent line stripes. Then, it can be found that there is a line stripe mismatch.

As an optional embodiment, before acquiring the first line stripe and the second line stripe collected by the first camera and the third line stripe and the fourth line stripe collected by the second camera, the method further includes: projecting the line stripes onto a surface of an object to be scanned, wherein adjacent distances between the adjacent line stripes in the plurality of line stripes are different; and collecting, by the first camera and the second camera, the line stripes on the surface of the object to be scanned.

Optionally, the projector projects a plurality of interval-variable vertical line stripes. Next, a detailed description is made by taking the line stripes shown in FIG. 3 as an example.

Figure 3:
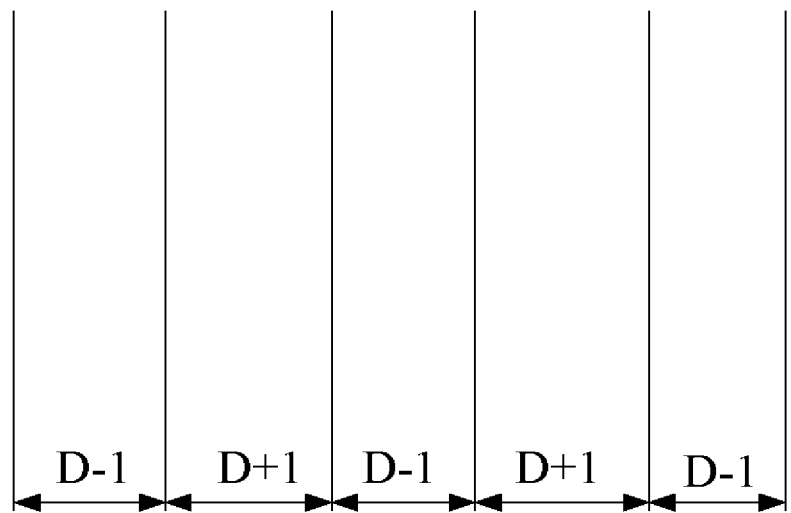
FIG. 3 is a schematic diagram II of the line stripes according to an embodiment of the present invention.

FIG. 3 is a schematic diagram II of the line stripes according to an embodiment of the present invention. As shown in FIG. 3, the plurality of line stripes at least include: line stripes 00, 01, 02, 03, 04 and 05. A distance between the line stripes 00 and 01 is D−1, a distance between the line stripes 01 and 02 is D+1, a distance between the line stripes 02 and 03 is D−1, a distance between the line stripes 03 and 04 is D+1, a distance between the line stripes 04 and 05 is D−1, a distance between the line stripes 05 and 10 is D, a distance between the line stripes 10 and 11 is D+1, a distance between the line stripes 11 and 12 is D−1, a distance between line stripes 12 and 13 is D+1, a distance between the line stripes 13 and 14 is D−1, and a distance between the line stripes 14 and 15 is D+1.

In the above embodiment of the present invention, the line stripes are set according to the above manner and projected onto the surface of the object to be scanned, the first image and the second image of the line stripes are collected by the first camera and the second camera, and the line stripe in the first image is matched with the line stripe in the second image, so as to determine whether the line stripes are mismatched according to the matching result.

Optionally, if the first line stripe is the line stripe 00, the second line stripe is the line stripe 01, the third line stripe is the line stripe 10 and the fourth line stripe is the line stripe 11, then the line stripe 00 in the first image is matched with the line stripe 10 in the second image, and the line stripe 01 in the first image is matched with the line stripe 11 in the second image.

It should be noted that δ is a parallax of the line stripe 00 in the left and right cameras. If a scanned object is a continuous curved surface, depth values of the line stripes on the object surface in the adjacent cycles do not change much, and then parallax value will be approximately equal, and are uniformly approximated by δ. If there is a mismatch between the line stripe 00 and the line stripe 10 in the left camera, then a parallax between the line stripe 00 of the left camera and the line stripe 10 of the right camera is and a parallax between the line stripe 01 of the left camera and the line stripe 11 of the right camera is which causes a drastic change in the reconstruction depth of the adjacent line stripes. Then, it can be found that there is a line stripe mismatch.

As an optional embodiment, in the plurality of line stripes, the adjacent distances between the adjacent line stripes are distributed according to an equal sum sequence.

FIG. 4 is a flow chart of a line stripe mismatch detection method according to an embodiment of the present invention. As shown in FIG. 4, the method includes the following steps:

step S402, project the line stripes onto a surface of an object to be scanned, wherein the line stripes include: a first line stripe cycle and a second line stripe cycle, a distance between a line stripe at a first position in the first line stripe cycle and a line stripe at a first position in the second line stripe cycle is a first predetermined distance, a distance between a line stripe at a second position in the first line stripe cycle and a line stripe at a second position in the second line stripe cycle is a second predetermined distance, the first predetermined distance is different from the second predetermined distance, the line stripe at the first position and the line stripe at the second position in the same line stripe cycle are adjacent, and cycle distances include: the first predetermined distance and the second predetermined distance;

step S404, collect, by the first camera and the second camera, the line stripes on the surface of the object to be scanned; and step S406, detect whether the line stripes collected by the first camera and the line stripes collected by the second camera are mismatched according to the cycle distances.

In the above embodiment of the present invention, the line stripes are set according to the above manner and projected onto the surface of the object to be scanned, the first image and the second image of the line stripes are collected by the first camera and the second camera, and the line stripe in the first image is matched with the line stripe in the second image, so that whether the line stripes to be mismatched is determined according to the distance between the line stripes at the same position in different line stripe cycles. Thus, the technical effect of detecting whether the line stripes to be mismatched is realized, thereby solving the technical problem of incapability of detecting whether the line stripes are mismatched.

According to the solution provided by step S406 above, in the line stripe matching process, if the line stripe collected by the first camera is the line stripe in the first line stripe cycle and the line stripe collected by the second camera is the line stripe in the second line stripe cycle, then the line stripe in the first line stripe cycle will be matched with the line stripe in the second line stripe cycle in the line stripe matching process.

For convenience of description, it is assumed that the line stripes collected by the first camera include the first line stripe and the second line stripe and the line stripes collected by the second camera include the third line stripe and the fourth line stripe, then the first line stripe is the line stripe at the first position in the first line stripe cycle, the second line stripe is the line stripe at the second position in the first line stripe cycle, the third line stripe is the line stripe at the first position in the second line stripe cycle, and the fourth line stripe is the line stripe at the second position in the second line stripe cycle. Therefore, the distance between the first line stripe and the third line stripe is the first predetermined distance, and the distance between the second line stripe and the fourth line stripe is the second predetermined distance. Since the first predetermined distance is different from the second predetermined distance, it can be found that there is a stripe mismatch.

Optionally, in the case that the line stripes collected by the first camera and the line stripes collected by the second camera are not mismatched, three-dimensional reconstruction is performed according to the matching result of the line stripes collected by the first camera and the line stripes collected by the second camera.

Figure 5:
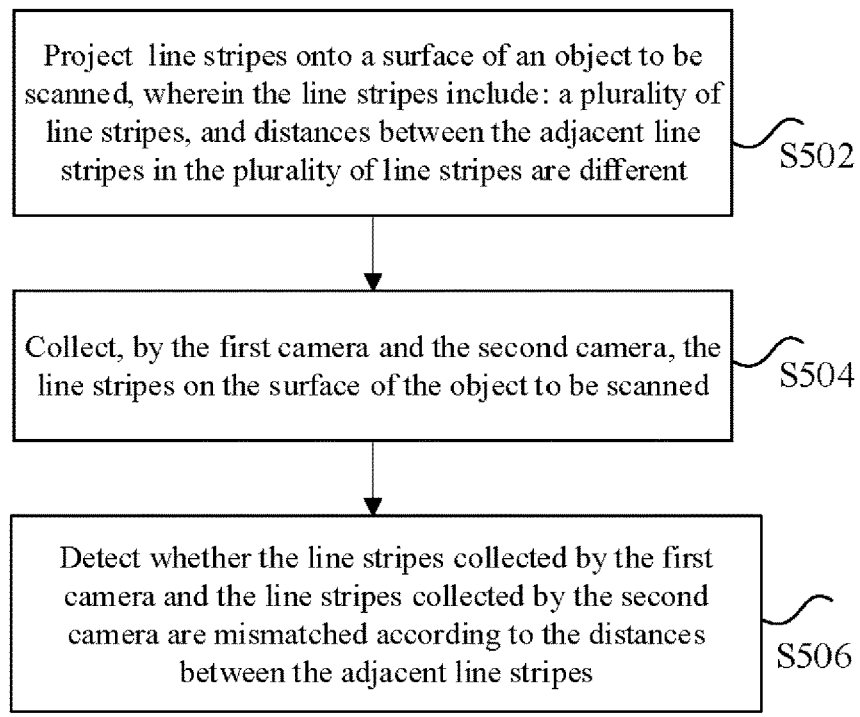
FIG. 5 is a flow chart of a line stripe mismatch detection method according to an embodiment of the present invention.

FIG. 5 is a flow chart of a line stripe mismatch detection method according to an embodiment of the present invention. As shown in FIG. 5, the method includes the following steps:

step S502, project line stripes onto a surface of an object to be scanned, wherein the line stripes include: a plurality of line stripes, and adjacent distances between the adjacent line stripes in the plurality of line stripes are different;

step S504, collect, by the first camera and the second camera, the line stripes on the surface of the object to be scanned; and step S506, detect whether the line stripes collected by the first camera and the line stripes collected by the second camera are mismatched according to the adjacent distances between the adjacent line stripes.

In the above embodiment of the present invention, the line stripes are set according to the above manner and projected onto the surface of the object to be scanned, the first image and the second image of the line stripes are collected by the first camera and the second camera, and the line stripe in the first image is matched with the line stripe in the second image, so that whether the line stripes to be mismatched is determined according to the adjacent distances between the adjacent line stripes. Thus, the technical effect of detecting whether the line stripes are mismatched is realized, thereby solving the technical problem of incapability of detecting whether the line stripes are mismatched.

According to the solution provided by step S506 above, it is assumed that the line stripes collected by the first camera include the first line stripe and the second line stripe, and the line stripes collected by the second camera include the third line stripe and the fourth line stripe, wherein the first line stripe is adjacent to the second line stripe, and the third line stripe is adjacent to the fourth line stripe. It is assumed that the distance between the first line stripe and the second line stripe is the first adjacent distance, the distance between the third line stripe and the fourth line stripe is the second adjacent distance, and the first adjacent distance is different from the second adjacent distance.

In the line stripe matching process, if there is a line stripe mismatch, then the first line stripe is matched with the third line stripe, and the second line stripe is matched with the fourth line stripe. Since the first adjacent distance is different from the second adjacent distance, it can be detected whether the line stripes collected by the first camera and the line stripes collected by the second camera are mismatched according to the distances.

Optionally, in the case that the line stripes collected by the first camera and the line stripes collected by the second camera are not mismatched, three-dimensional reconstruction is performed according to the matching result of the line stripes collected by the first camera and the line stripes collected by the second camera.

Figure 6:
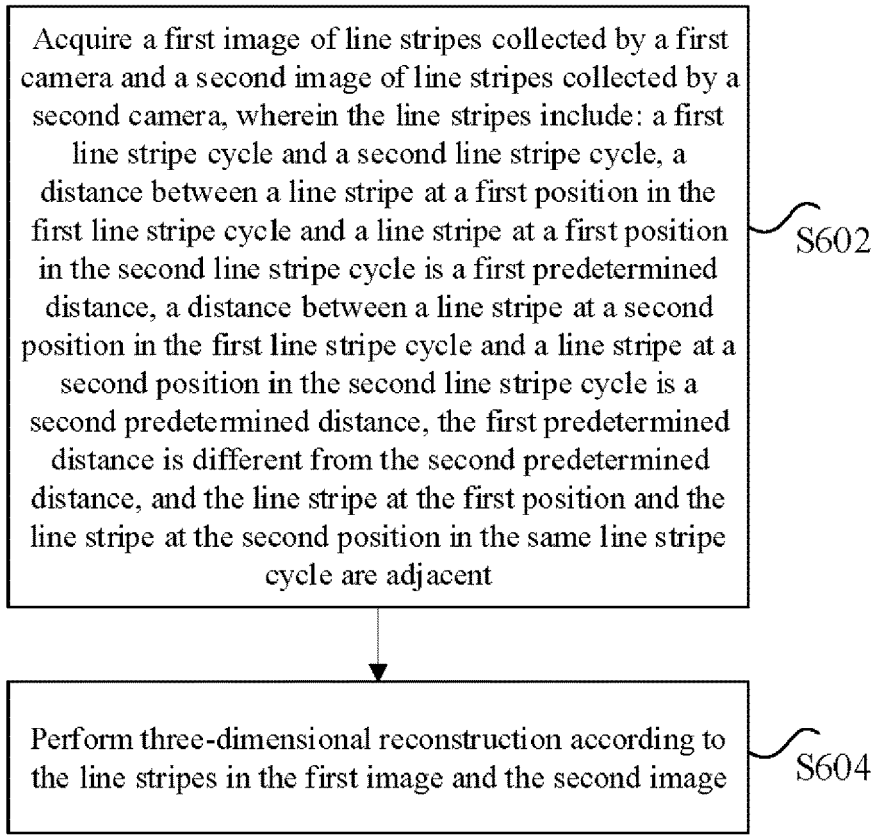
FIG. 6 is a flow chart of a three-dimensional reconstruction method according to an embodiment of the present invention.

FIG. 6 is a flow chart of a three-dimensional reconstruction method according to an embodiment of the present invention. As shown in FIG. 6, the method includes the following steps:

step S602, acquire a first image of line stripes collected by a first camera and a second image of line stripes collected by a second camera, wherein the line stripes include: a first line stripe cycle and a second line stripe cycle, a distance between a line stripe at a first position in the first line stripe cycle and a line stripe at a first position in the second line stripe cycle is a first predetermined distance, a distance between a line stripe at a second position in the first line stripe cycle and a line stripe at a second position in the second line stripe cycle is a second predetermined distance, the first predetermined distance is different from the second predetermined distance, and the line stripe at the first position and the line stripe at the second position in the same line stripe cycle are adjacent; and step S604, perform three-dimensional reconstruction according to the line stripes in the first image and the second image.

According to the above embodiment of the present invention, in the process of performing three-dimensional reconstruction on a target object, the line stripes can be previously projected onto the target object, then the first image and the second image of the line stripes are respectively collected by the first camera and the second camera, the line stripes in the first image and the second image are matched, and the three-dimensional reconstruction can be performed according to the matching result. The line stripes include: the first line stripe cycle and the second line stripe cycle, the distance between the line stripe at the first position in the first line stripe cycle and the line stripe at the first position in the second line stripe cycle is the first predetermined distance, the distance between the line stripe at the second position in the first line stripe cycle and the line stripe at the second position in the second line stripe cycle is the second predetermined distance, the first predetermined distance is different from the second predetermined distance, and the line stripe at the first position and the line stripe at the second position in the same line stripe cycle are adjacent. Thus, since the distances between the line stripes at the same position in different line stripe cycles are different, the mismatch between the line stripes in different line stripe cycles can be avoided, thereby solving the technical problem of incapability of detecting whether the line stripes are mismatched.

Optionally, the performing of the three-dimensional reconstruction according to the line stripes in the first image and the second image includes: matching the line stripes at the same position in the same cycle in the first image and the second image to obtain a matching result; determining a parallax between the line stripes at the same position in the same cycle in the first image and the second image according to the matching result; determining a depth value between the line stripes at the same position in the same cycle in the first image and the second image according to the parallax; and performing three-dimensional reconstruction according to the depth value.

For example, the first image at least includes the first line stripe, wherein the first line stripe may be the line stripe at the first position in the first line stripe cycle. The second image at least includes the third line stripe, wherein the third line stripe may be the line stripe at the first position in the first line stripe cycle. The first line stripe in the first image is matched with the third line stripe in the second image, and the parallax between the first line stripe and the third line stripe is calculated. The depth value between the first line stripe and the third line stripe is determined according to the parallax. The three-dimensional reconstruction is performed according to the depth value.

Figure 7:
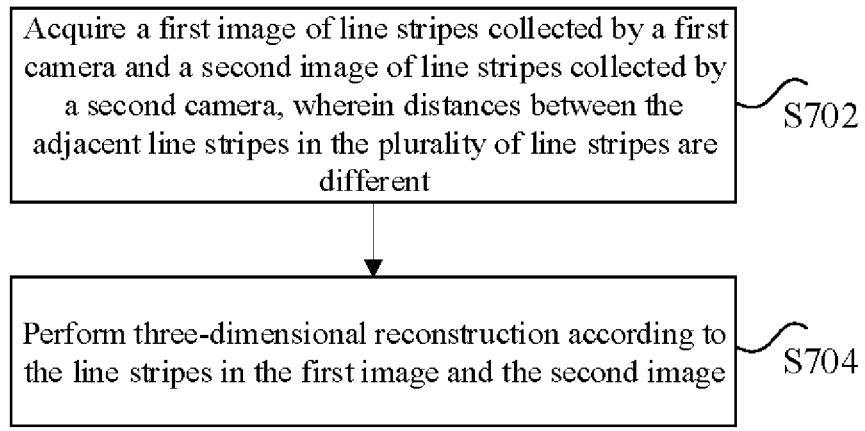
FIG. 7 is a flow chart of a three-dimensional reconstruction method according to an embodiment of the present invention.

FIG. 7 is a flow chart of a three-dimensional reconstruction method according to an embodiment of the present invention. As shown in FIG. 7, the method includes the following steps:

step S702, acquire a first image of line stripes collected by a first camera and a second image of line stripes collected by a second camera, wherein adjacent distances between the adjacent line stripes in the plurality of line stripes are different; and step S704, perform three-dimensional reconstruction according to the line stripes in the first image and the second image.

According to the above embodiment of the present invention, in the process of performing three-dimensional reconstruction on a target object, the line stripes can be previously projected onto the target object, then the first image and the second image of the line stripes are respectively collected by the first camera and the second camera, the line stripes in the first image and the second image are matched, and the three-dimensional reconstruction can be performed according to the matching result. The adjacent distances between the adjacent line stripes in the plurality of line stripes are different. Thus, since the distances between the line stripes are different, the mismatch between the line stripes in different line stripe cycles can be avoided, thereby solving the technical problem of incapability of detecting whether the line stripes are mismatched.

According to still another embodiment of the present invention, further provided is a storage medium, including a stored program, wherein when being run, the program executes the line stripe mismatch detection method according to any of the items above.

According to still another embodiment of the present invention, further provided is a processor, configured to run a program, wherein when being run, the program executes the line stripe mismatch detection method according to any of the items above.

According to an embodiment of the present invention, further provided is a line stripe mismatch detection device embodiment. It should be noted that the line stripe mismatch detection device can be used to execute the line stripe mismatch detection method in the embodiments of the present invention, and the line stripe mismatch detection method in the embodiments of the present invention can be executed in the line stripe mismatch detection device.

Figure 8:
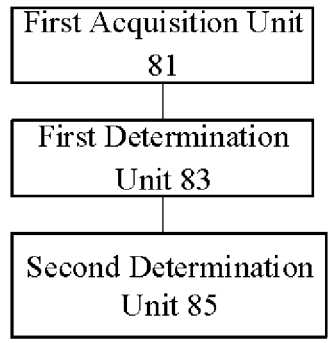
FIG. 8 is a schematic diagram of a line stripe mismatch detection device according to an embodiment of the present invention.

FIG. 8 is a schematic diagram of a line stripe mismatch detection device according to an embodiment of the present invention. As shown in FIG. 8, the device may includes: a first acquisition unit 81, configured to acquire a first image of line stripes collected by a first camera and a second image of line stripes collected by a second camera, wherein the first image at least includes: a first line stripe and a second line stripe; the second image at least includes: a third line stripe and a fourth line stripe, the first line stripe is adjacent to the second line stripe, and the third line stripe is adjacent to the fourth line stripe; a first determination unit 83, configured to match the first line stripe with the third line stripe, determine a first test distance between the first line stripe and the third line stripe, match the second line stripe with the fourth line stripe, and determine a second test distance between the second line stripe and the fourth line stripe; and a second determination unit 85, configured to determine whether the line stripes are mismatched according to the first test distance and the second test distance.

It should be noted that the first acquisition unit 81 in this embodiment may be configured to execute step S102 in the embodiment of the present application, the first determination unit 83 in this embodiment may be configured to execute step S104 in the embodiment of the present application, and the second determination unit 85 in this embodiment may be configured to execute step S106 in the embodiment of the present application. The above units and the corresponding steps implement the same examples and application scenarios, but are not limited to the content disclosed in the above embodiment.

According to the above embodiments of the present invention, in the three-dimensional modeling process, the first camera acquires the first line stripe and the second line stripe adjacent to each other, the second camera acquires the third line stripe and the fourth line stripe adjacent to each other, the first line stripe is matched with the third line stripe, the second line stripe is matched with the fourth line stripe, then the first test distance between the first line stripe and the third line stripe and the second test distance between the second line stripe and the fourth line stripe are calculated, and whether the first line stripe and the third line stripe are mismatched and whether the second line stripe and the fourth line stripe are mismatched are determined according to the first test distance and the second test distance, so that the technical effect of detecting whether the line stripes to be mismatched is realized, thereby solving the technical problem of incapability of detecting whether the line stripes are mismatched.

As an optional embodiment, the device further includes: a first projection module, configured to project, before acquiring the first line stripe and the second line stripe collected by the first camera and the third line stripe and the fourth line stripe collected by the second camera, the line stripes onto a surface of an object to be scanned, wherein the line stripes include: a first line stripe cycle and a second line stripe cycle, a distance between a line stripe at a first position in the first line stripe cycle and a line stripe at a first position in the second line stripe cycle is a first predetermined distance, a distance between a line stripe at a second position in the first line stripe cycle and a line stripe at a second position in the second line stripe cycle is a second predetermined distance, the first predetermined distance is different from the second predetermined distance, and the line stripe at the first position and the line stripe at the second position in the same line stripe cycle are adjacent; and a first collection module, configured to collect, by the first camera and the second camera, the line stripes on the surface of the object to be scanned.

As an optional embodiment, the device further includes: a second projection module, configured to project, before acquiring the first line stripe and the second line stripe collected by the first camera and the third line stripe and the fourth line stripe collected by the second camera, the line stripes onto the surface of the object to be scanned, wherein adjacent distances between the adjacent line stripes in the plurality of line stripes are different; and a second collection module, configured to collect, by the first camera and the second camera, the line stripes on the surface of the object to be scanned.

Figure 9:
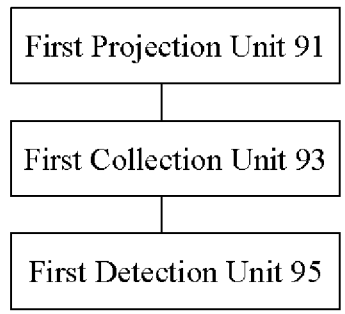
FIG. 9 is a schematic diagram of a line stripe mismatch detection device according to an embodiment of the present invention.

FIG. 9 is a schematic diagram of a line stripe mismatch detection device according to an embodiment of the present invention. As shown in FIG. 9, the device may includes: a first projection unit 91, configured to project the line stripes onto a surface of an object to be scanned, wherein the line stripes include: a first line stripe cycle and a second line stripe cycle, a distance between a line stripe at a first position in the first line stripe cycle and a line stripe at a first position in the second line stripe cycle is a first predetermined distance, a distance between a line stripe at a second position in the first line stripe cycle and a line stripe at a second position in the second line stripe cycle is a second predetermined distance, the first predetermined distance is different from the second predetermined distance, the line stripe at the first position and the line stripe at the second position in the same line stripe cycle are adjacent, and cycle distances include: the first predetermined distance and the second predetermined distance; a first collection unit 93, configured to collect, by a first camera and a second camera, the line stripes on the surface of the object to be scanned; and a first detection unit 95, configured to detect whether the line stripes collected by the first camera and the line stripes collected by the second camera are mismatched according to the cycle distances.

It should be noted that the first projection unit 91 in this embodiment may be configured to execute step S402 in the embodiment of the present application, the first collection unit 93 in this embodiment may be configured to execute step S404 in the embodiment of the present application, and the first detection unit 95 in this embodiment may be configured to execute step S406 in the embodiment of the present application. The above units and the corresponding steps implement the same examples and application scenarios, but are not limited to the content disclosed in the above embodiment.

In the above embodiment of the present invention, the line stripes are set according to the above manner and projected onto the surface of the object to be scanned, the first image and the second image of the line stripes are collected by the first camera and the second camera, and the line stripe in the first image is matched with the line stripe in the second image, so that whether the line stripes are mismatched is determined according to the distance between the line stripes at the same position in different line stripe cycles. Thus, the technical effect of detecting whether the line stripes to be mismatched is realized, thereby solving the technical problem of incapability of detecting whether the line stripes are mismatched.

Figure 10:
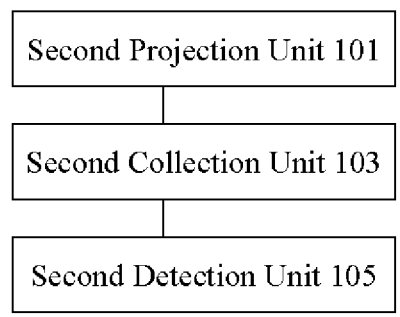
FIG. 10 is a schematic diagram of a line stripe mismatch detection device according to an embodiment of the present invention.

FIG. 10 is a schematic diagram of a line stripe mismatch detection device according to an embodiment of the present invention. As shown in FIG. 10, the device may includes: a second projection unit 101, configured to project the line stripes onto a surface of an object to be scanned, wherein adjacent distances between the adjacent line stripes in the plurality of line stripes are different; a second collection unit 103, configured to collect, by a first camera and a second camera, the line stripes on the surface of the object to be scanned; and a second detection unit 105, configured to detect whether the line stripes collected by the first camera and the line stripes collected by the second camera are mismatched according to the distances.

It should be noted that the second projection unit 101 in this embodiment may be configured to execute step S502 in the embodiment of the present application, the second collection unit 103 in this embodiment may be configured to execute step S504 in the embodiment of the present application, and the second detection unit 105 in this embodiment may be configured to execute step S506 in the embodiment of the present application. The above units and the corresponding steps implement the same examples and application scenarios, but are not limited to the content disclosed in the above embodiment.

In the above embodiment of the present invention, the line stripes are set according to the above manner and projected onto the surface of the object to be scanned, the first image and the second image of the line stripes are collected by the first camera and the second camera, and the line stripe in the first image is matched with the line stripe in the second image, so that whether the line stripes are mismatched is determined according to the adjacent distances between the adjacent line stripes. Thus, the technical effect of detecting whether the line stripes to be mismatched is realized, thereby solving the technical problem of incapability of detecting whether the line stripes are mismatched.

Figure 11:
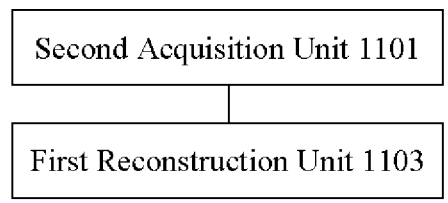
FIG. 11 is a schematic diagram of a three-dimensional reconstruction device according to an embodiment of the present invention.

FIG. 11 is a schematic diagram of a three-dimensional reconstruction device according to an embodiment of the present invention. As shown in FIG. 11, the device may includes: a second acquisition unit 1101, configured to acquire a first image of line stripes collected by a first camera and a second image of line stripes collected by a second camera, wherein the line stripes include: a first line stripe cycle and a second line stripe cycle, a distance between a line stripe at a first position in the first line stripe cycle and a line stripe at a first position in the second line stripe cycle is a first predetermined distance, a distance between a line stripe at a second position in the first line stripe cycle and a line stripe at a second position in the second line stripe cycle is a second predetermined distance, the first predetermined distance is different from the second predetermined distance, and the line stripe at the first position and the line stripe at the second position in the same line stripe cycle are adjacent; and a first reconstruction unit 1103, configured to perform three-dimensional reconstruction according to the line stripes in the first image and the second image.

It should be noted that the second acquisition unit 1101 in this embodiment may be configured to execute step S602 in the embodiment of the present application, and the first reconstruction unit 1103 in this embodiment may be configured to execute step S604 in the embodiment of the present application. The above units and the corresponding steps implement the same examples and application scenarios, but are not limited to the content disclosed in the above embodiment.

According to the above embodiment of the present invention, in the process of performing three-dimensional reconstruction on a target object, the line stripes can be previously projected onto the target object, then the first image and the second image of the line stripes are respectively collected by the first camera and the second camera, the line stripes in the first image and the second image are matched, and the three-dimensional reconstruction can be performed according to the matching result. The line stripes include: the first line stripe cycle and the second line stripe cycle, the distance between the line stripe at the first position in the first line stripe cycle and the line stripe at the first position in the second line stripe cycle is the first predetermined distance, the distance between the line stripe at the second position in the first line stripe cycle and the line stripe at the second position in the second line stripe cycle is the second predetermined distance, the first predetermined distance is different from the second predetermined distance, and the line stripe at the first position and the line stripe at the second position in the same line stripe cycle are adjacent. Thus, since the distances between the line stripes at the same position in different line stripe cycles are different, the mismatch between the line stripes in different line stripe cycles can be avoided, thereby solving the technical problem of incapability of detecting whether the line stripes are mismatched.

Figure 12:
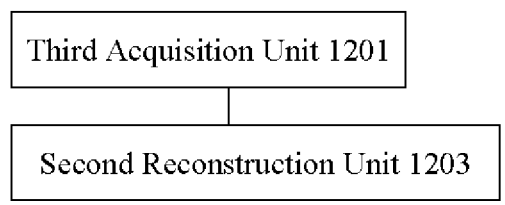
FIG. 12 is a schematic diagram of a three-dimensional reconstruction device according to an embodiment of the present invention.

FIG. 12 is a schematic diagram of a three-dimensional reconstruction device according to an embodiment of the present invention. As shown in FIG. 12, the device may includes: a third acquisition unit 1201, configured to acquire a first image of line stripes collected by a first camera and a second image of line stripes collected by a second camera, wherein adjacent distances between the adjacent line stripes in the plurality of line stripes are different; and a second reconstruction unit 1203, configured to perform three-dimensional reconstruction according to the line stripes in the first image and the second image.

It should be noted that the third acquisition unit 1201 in this embodiment may be configured to execute step S702 in the embodiment of the present application, and the second reconstruction unit 1203 in this embodiment may be configured to execute step S704 in the embodiment of the present application. The above units and the corresponding steps implement the same examples and application scenarios, but are not limited to the content disclosed in the above embodiment.

According to the above embodiment of the present invention, in the process of performing three-dimensional reconstruction on a target object, the line stripes can be previously projected onto the target object, then the first image and the second image of the line stripes are respectively collected by the first camera and the second camera, the line stripes in the first image and the second image are matched, and the three-dimensional reconstruction can be performed according to the matching result. The adjacent distances between the adjacent line stripes in the plurality of line stripes are different. Thus, since the distances between the line stripes are different, the mismatch between the line stripes in different line stripe cycles can be avoided, thereby solving the technical problem of incapability of detecting whether the line stripes are mismatched.

The sequence numbers of the preceding embodiments of the present invention are merely for description but do not indicate the preference of the embodiments.

In the foregoing embodiments of the present invention, the description of each embodiment has its own emphasis, for the part not described in detail in one embodiment, reference may be made to the relevant description of other embodiments.

In the several embodiments provided by the present application, it should be understood that the disclosed technical content may be implemented in other manners. The device embodiments described above are merely schematic, for example, the division of the units may be logical function division, and there may be division manners in actual implementation, for example, multiple units or components may be combined or may be integrated into another system, or some features may be ignored or not implemented. In addition, the illustrated or discussed mutual coupling or direct coupling or communication may be indirect coupling or communication through some interfaces, units or modules, or may be electrical or other forms.

The units described as separate parts may or may not be physically separated, and the parts displayed as units may or may not be physical units, that is, may be located in one place, or may be distributed on multiple units. Some or all of the units may be selected according to actual needs to achieve the purpose of the solution of the present embodiment.

In addition, each functional unit in each embodiment of the disclosure may be integrated into one processing unit, or each unit may exist physically separately, or two or more units may be integrated into one unit. The foregoing integrated unit may be implemented in the form of hardware, and may also be implemented in the form of a software function unit.

The integrated unit, if implemented in the form of a software functional unit and sold or used as a stand-alone product, may be stored in a computer-readable storage medium. Based on such understanding, the technical solution may be essentially, or the part of the present invention which contributes to the prior art or all or part of the technical solution may be embodied in the form of a software product, and the computer software product is stored in a storage medium and includes a plurality of instructions for causing a computer device (which may be a personal computer, a server, network device, and the like) to perform all or part of the steps of the methods described in the various embodiments of the present invention. The foregoing storage medium may include a USB flash disk, a read-only memory (ROM), a random access memory (RAM), a removable hard disk, a magnetic disk, a light disk and various other media which can store program codes.

The above descriptions are only the exemplary implementations of the present invention. It should be pointed out that for a person of ordinary skill in the art, without departing from the principle of the present invention, several improvements and modifications can also be made, and these improvements and modifications should also fall within the protection scope of the present invention.

INDUSTRIAL APPLICABILITY

The solutions provided by the embodiments of the present invention can be applied to the three-dimensional modeling process. Through the embodiments of the present invention, the technical problem of incapability of detecting whether the line stripes are mismatched is solved, and the technical effect of detecting whether the line stripes are mismatched is realized.

The invention claimed is:

1. A line stripe mismatch detection method, comprising:
   acquiring a first image of line stripes collected by a first camera and a second image of line stripes collected by a second camera, wherein the first image at least comprises: a first line stripe and a second line stripe; the second image at least comprises: a third line stripe and a fourth line stripe, the first line stripe is adjacent to the second line stripe, and the third line stripe is adjacent to the fourth line stripe;
   matching the first line stripe with the third line stripe to determine a first test distance between the first line stripe and the third line stripe, matching the second line stripe with the fourth line stripe to determine a second test distance between the second line stripe and the fourth line stripe; and
   determining whether the line stripes are mismatched according to the first test distance and the second test distance;
   wherein before acquiring the first line stripe and the second line stripe collected by the first camera and the third line stripe and the fourth line stripe collected by the second camera, the method further comprises:
   projecting the line stripes onto a surface of an object to be scanned, wherein the line stripes comprise: a first line stripe cycle and a second line stripe cycle, a distance between a line stripe at a first position in the first line stripe cycle and a line stripe at a first position in the second line stripe cycle is a first predetermined distance, a distance between a line stripe at a second position in the first line stripe cycle and a line stripe at a second position in the second line stripe cycle is a second predetermined distance, the first predetermined distance is different from the second predetermined distance, and the line stripe at the first position and the line stripe at the second position in the same line stripe cycle are adjacent; and
   collecting, by the first camera and the second camera, the line stripes on the surface of the object to be scanned.

2. The method as claimed in claim 1, wherein before acquiring the first line stripe and the second line stripe collected by the first camera and the third line stripe and the fourth line stripe collected by the second camera, the method further comprises:
   projecting the line stripes onto a surface of an object to be scanned, wherein adjacent distances between the adjacent line stripes in the plurality of line stripes are different; and
   collecting, by the first camera and the second camera, the line stripes on the surface of the object to be scanned.

3. A non-transitory computer-readable storage medium, comprising a stored program, wherein the program executes the line stripe mismatch detection method according to claim 1.

4. A processor, configured to run a program, wherein when being run, the program executes the line stripe mismatch detection method according to claim 1.

5. The method as claimed in claim 1, wherein the determining whether the line stripes are mismatched according to the first test distance and the second test distance comprises:
   determining a distance difference between the first test distance and the second test distance;
   determining whether the distance difference is greater than a predetermined distance threshold;
   when the distance difference is greater than the predetermined distance threshold, determining that the line stripes are mismatched; and when the distance difference is not greater than the predetermined distance threshold, determining the line stripes are not mismatched.

6. The method as claimed in claim 1, wherein the determining whether the line stripes are mismatched according to the first test distance and the second test distance comprises:
   determining a first disparity between the first line stripe and the third line stripe according to the first test distance;
   determining a second disparity between the second line stripe and the fourth line stripe according to the second test distance; and
   determining whether the line stripes are mismatched according to the first disparity and the second disparity.

7. The method as claimed in claim 6, wherein the determining whether the line stripes are mismatched according to the first disparity and the second disparity comprises:
- determining a disparity difference between the first disparity and the second disparity;
- determining whether the disparity difference is greater than a predetermined disparity threshold;
- when the disparity difference is greater than the predetermined disparity threshold, determining that the line stripes are mismatched; and when the disparity difference is not greater than the predetermined disparity threshold, determining that the line stripes are not mismatched.

8. The method as claimed in claim 6, wherein the determining whether the line stripes are mismatched according to the first disparity and the second disparity comprises:
- determining a first depth value corresponding to the first disparity and a second depth value corresponding to the second disparity; and
- determining whether the line stripes are mismatched according to the first depth value and the second depth value.

9. The method as claimed in claim 8, wherein the determining whether the line stripes are mismatched according to the first depth value and the second depth value comprises:
- determining a depth difference between the first depth value and the second depth value;
- determining whether the depth difference is greater than a predetermined depth threshold;
- when the depth difference is greater than the predetermined depth threshold, determining that the line stripes are mismatched; and when the depth difference is not greater than the predetermined depth threshold, determining that the line stripes are not mismatched.

* * * * *